United States Patent [19]

Matsumoto et al.

[11] Patent Number: 4,616,849
[45] Date of Patent: Oct. 14, 1986

[54] TRAILING LINK BEAM SUSPENSION

[75] Inventors: Yoshiyuki Matsumoto, Tokyo; Hideki Maru, Wako, both of Japan

[73] Assignee: Honda Giken Kogyo Kabushiki Kaisha, Tokyo, Japan

[21] Appl. No.: 578,358

[22] Filed: Feb. 8, 1984

[30] Foreign Application Priority Data

Sep. 27, 1983 [JP] Japan .............................. 58-178500

[51] Int. Cl.[4] ............................................. B60G 11/16
[52] U.S. Cl. ................................................. 280/724
[58] Field of Search ..................... 280/724, 725, 726; 267/20 A, 20 R, 22, 151, 57

[56] References Cited

U.S. PATENT DOCUMENTS 4,085,945  4/1978  Bicht et al. ........................ 280/724

FOREIGN PATENT DOCUMENTS 171468   11/1951  Fed. Rep. of Germany ...... 280/724
2211331   9/1973  Fed. Rep. of Germany ...... 280/724
9224      1/1977  Japan ................................. 280/725
130804    8/1982  Japan ................................. 280/726
53506     3/1983  Japan ................................. 280/726

Primary Examiner—John J. Love
Assistant Examiner—Ross Weaver
Attorney, Agent, or Firm—Roberts, Spiecens & Cohen

[57] ABSTRACT

A trailing link type beam suspension comprising a pair of left and right trailing arms, an axle beam fixed to one of the trailing arms and pivotably connected to the other and a pair of dampers provided between the axle beam and chassis. The axle beam is disposed in a position displaced from the axis of rotation of wheels in the back or forth direction of the chassis, and the dampers are disposed so that their axes pass in the vicinity of the axis of rotation of the wheel. A pair of coil springs are disposed coaxially with the dampers, respectively, between the chassis and axle beam. A panhard rod whose axis is positioned in the vicinity of the axis of rotation of the wheels is connected, between the chassis and axle beam, so as to carry a lateral load of the chassis.

11 Claims, 4 Drawing Figures

FIG. I PRIOR ART

TRAILING LINK BEAM SUSPENSION

BACKGROUND OF THE INVENTION

1. Field of the Invention

The present invention relates to a trailing link type beam suspension and more particularly, to a beam suspension which is suitable for use as the rear suspension of a front-wheel drive automobile.

2. Description of the Prior Art

A trailing link type beam suspension has been proposed wherein one of a pair of left and right trailing arms is fixed to an axle beam whereas the other is rotatably connected to the axle beam in order that left and right wheels may be moved up and down freely. One example of such a trailing link type beam suspension will be described with reference to FIGS. 1 and 2. Left and right wheels 1 and 2 are rotatably supported on axles 3 and 4, respectively. Axle beam 5 secured and connected to the axles 3 and 4, respectively, are arranged below the axes Q of rotation of these wheels 1 and 2. A pair of left and right trailing arms 6 and 7 are respectively connected between the chassis (not shown) and axles 3 and 4 in order to permit vertical movement of the axle beam 5 with respect to the chassis and to resist lateral loads to control the back and forth movement. That is, in FIG. 1, the rear end of the left trailing arm 6 is fixed to the point of connection between the left axle 3 and axle beam 5, and the front end of the trailing arm 6 is connected to the chassis in such a way that it may be rotated around an axis $O_L$. The rear end of the right trailing arm 7 is connected to the point of connection between the right axle 4 and axle beam 5 through a swinging bearing 8 in such a way that it may be rotated around the axis Q, and the front end of the trailing arm 7 is connected to the chassis in such a way that it may be rotated around an axis $O_R$. Accordingly, when the left and right wheels 1 and 2 are moved up and down, the axle beam 5 swings up and down around the axes $O_L$ and $O_R$. A pair of left and right coil springs 9 and 10 are provided between the axle beam 5 and the chassis in order to resiliently oppose the chassis, and a pair of left and right dampers 11 and 12 are provided in order to absorb vibration energies of the coil springs 9 and 10. The dampers 11 and 12 are obliquely and forwardly arranged between front ends 15, 16 of forwardly projected arms 13, 14 provided integrally with the axle beam 5 and the chassis. A panhard rod 17 is connected between the axle beam 5 and the chassis in such a way that it may be rotated around respective axes almost parallel with the longitudinal direction of the chassis, in order to control the lateral movement of the axle beam 5 with respect to the chassis.

In such a trailing link type beam suspension, for example, in the event that in FIG. 1, only the left-hand wheel travels over a projected portion of the road surface and moves up, the left end of the axle beam 5 is rotated around the axis $O_L$ by the trailing arm 6 and moves up. Since the axle beam 5 and trailing arm 6 are to each other, the axle beam 5 rotates clockwise as viewed from the right wheel in of FIG. 1. On the other hand, since the right-hand trailing arm 7 is rotatably connected to the axle beam 5, the tailing arm 7 is not affected by the rotation of the axle beam 5. That is, the right-hand trailing arm 7 is never swung to follow the vertical movement of the left-hand wheel 1, and thus, the right-hand wheel 2 is maintained in its unchanged state.

Incidentally, since the axle beam 5 is rarely subjected to torsional deformation, rotation of the left end of the axle 5 at that time is transmitted to the right end without modification. Accordingly, at this time, the arm 14 integrally provided on the right end of the axle beam 5 is rotated clockwise as viewed from the right wheel in FIG. 1, that is, counterclockwise in FIG. 2, and the front end 16 thereof moves down. The center of rotation is substantially the axis Q, and therefore, the damper 12 is drawn considerably downwardly. Therefore, an attentuation force is generated in the damper 12, as a consequence of which there occurs a problem that the chassis rocks to deteriorate riding comfort.

Since a tension is applied to the damper 12 as described above, if the coil spring 10 is provided for the damper 12, the riding comfort further deteriorates. Therefore, mounting portions for the coil spring 10 have to be provided, separately from the mounting portion for the damper 12, on the axle beam 5 and chassis. And, the coil spring 9 needs be mounted in symmetry with the coil spring 10, and therefore, the mounting portion for the coil spring 9 has to be also provided separately from the mounting portion of the damper 11.

In addition, the trailing link type suspension of the type as described is not possible to make the rigidity of the trailing arms 6 and 7 great with respect to the lateral load of the chassis. In view of this, the panhard rod 17 is provided between the axle beam 5 and chassis to resist said load. This panhard rod 17 is arranged adjacent to the axle beam 5. However, the coil springs 9, 10 are provided on the axle beam 5 as previously described, and therefore, normally, a rearwardly projected arm 18 is provided on one end of the axle beam 5, and one end of the panhard rod 17 is connected to the foremost end of the arm 18 in such a way that it may be rotated around an axis substantially parallel to the longitudinal axis of the chassis whereas the other end of the panhard rod 17 is likewise rotatably connected to the chassis by means of the point of connection 19 to the chassis. This panhard rod 17 is arranged such that the point of connection 19 to the chassis is spaced further from the axle beam than the point of connection to the axle beam 5 to prevent interference with the axle beam 5 when the latter is moved up and down by the trailing arms 6 and 7. Thus, the point of connection 19 to the chassis of the panhard rod 17 is considerably spaced rearwardly from the axis of rotation Q of the wheels 1 and 2 in plan view, as can be seen in FIG. 1.

In the arrangement as described above, when lateral forces are applied to the wheels 1 and 2 during turning of the vehicle, this results in a moment of rotation of the suspension system around the point of connection 19 of the panhard rod 17 to the chassis. Generally, rubber bushings are inserted at the points of connection between the trailing arms 6, 7 and the chassis, and therefore, the bushings are sometimes deformed by the moment of rotation which impairs the steering stability of the vehicle. If the spring constant of the rubber bushings is suitable to maintain the steering stability, vibrations from the axle beam 5 are transmitted to the chassis to deteriorate the riding comfort.

SUMMARY OF THE INVENTION

The present invention has been accomplished in view of the above-described problems inherent in the prior art. It is a first object of the invention to provide a trailing link type beam suspension of this kind which can minimize generation of an attenuation force of a damper due to a difference in angles of rotation between the left and right trailing arms when one wheel of the vehicle travels over a projected portion of the road surface and thereby to obtain a suspension with good riding comfort.

It is a second object of the invention to provide a trailing link type beam suspension wherein even if a coil spring is arranged on the same axis as that of a damper, the spring reaction force is rarely varied by expansion of the coil spring whereby assembling and processing may be easily achieved and space may be saved.

It is a third object of the invention to provide a trailing link type beam suspension, which particularly uses coil springs, wherein even if a lateral force is applied to a wheel, the amount of deviation caused thereby is made to be small to enhance the steering stability, and a rubber bushing with a small spring constant can be used for a trailing arm to further improve the riding comfort.

To achieve the above-described objects, in the present invention, the axle beam is rearwardly displaced from the axis of rotation of the wheels and dampers are arranged in such a way that their axes cross in the vicinity of the axis of rotation of the wheels. Also, the springs are arranged on the same axis as the dampers. Morevoer, the axis of the panhard rod is arranged in the vicinity of said axis of rotation of the wheel.

DESCRIPTION OF THE PREFERRED EMBODIMENT

Figure 1:
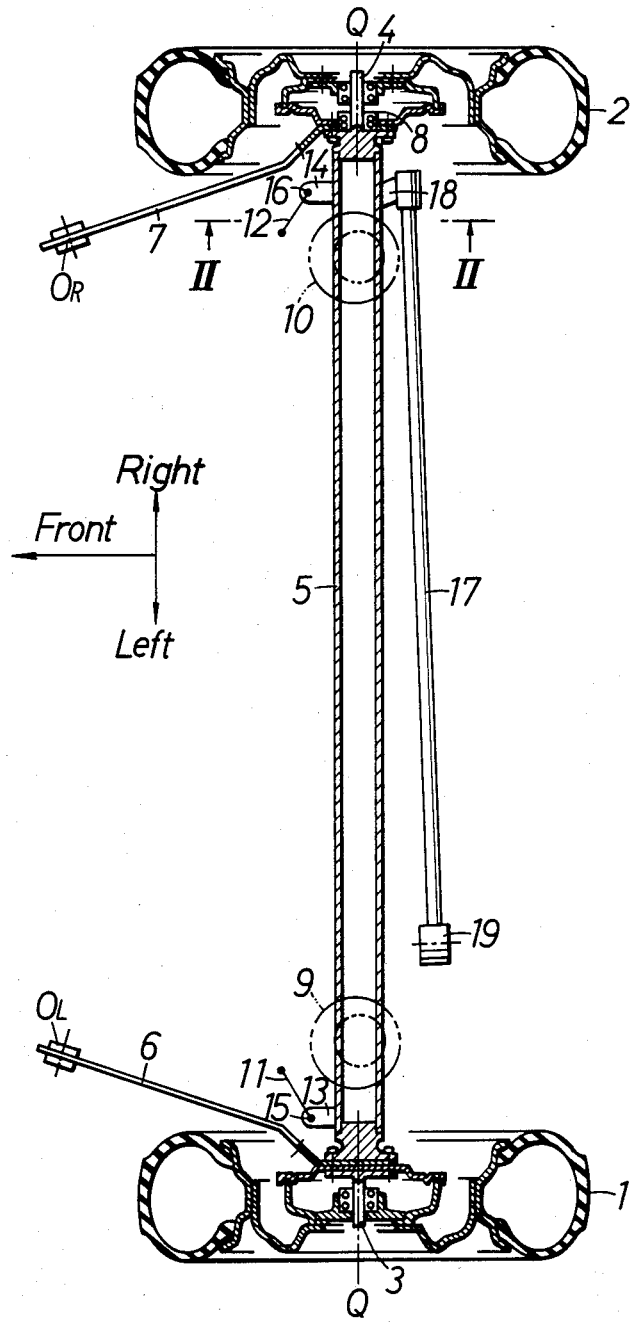
FIG. 1 is a longitudinal sectional plan view showing a prior art embodiment of a trailing link type beam suspension which is intended to be improved by the present invention.
Figure 2:
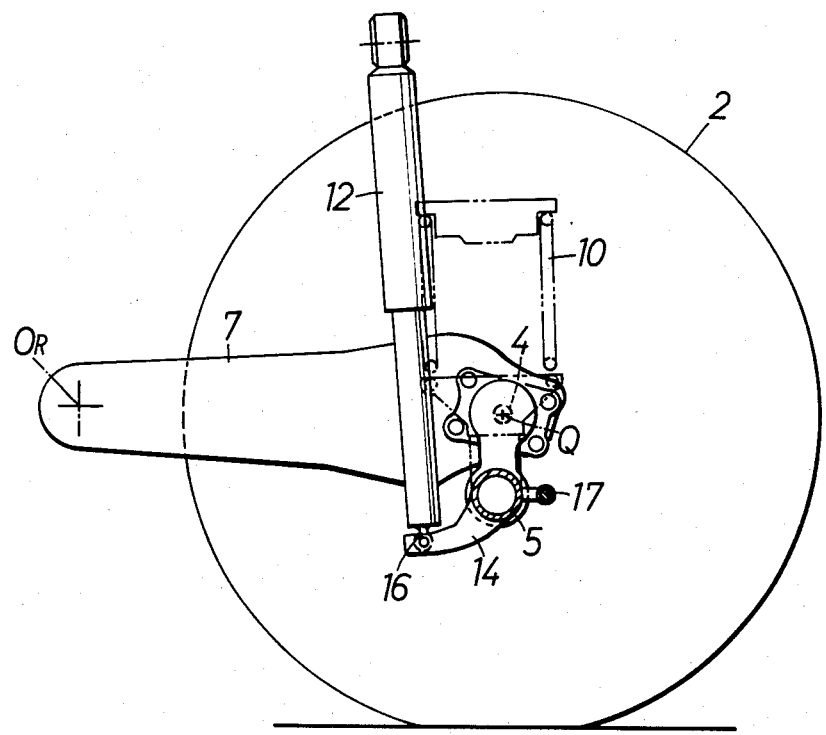
FIG. 2 is a cross sectional side view of an essential part taken on the line II—II in FIG. 1.
Figure 3:
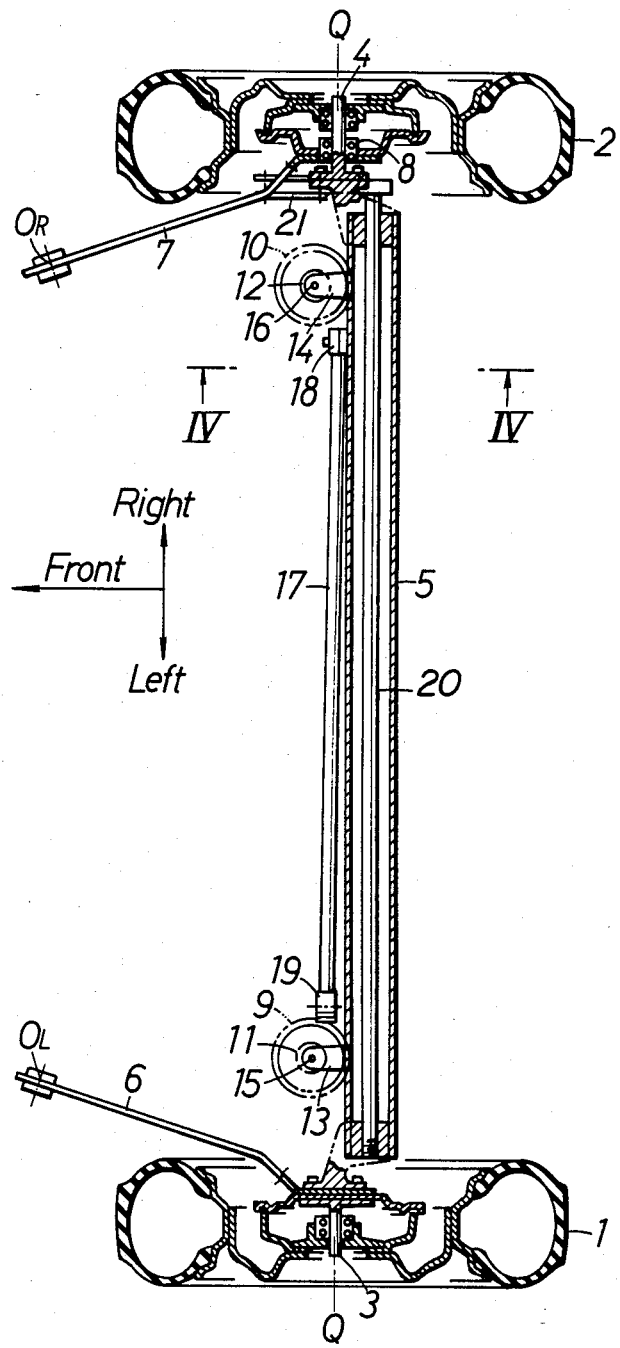
FIG. 3 is a longitudinal sectional plan view showing one embodiment of a trailing link type beam suspension in accordance with the present invention.
Figure 4:
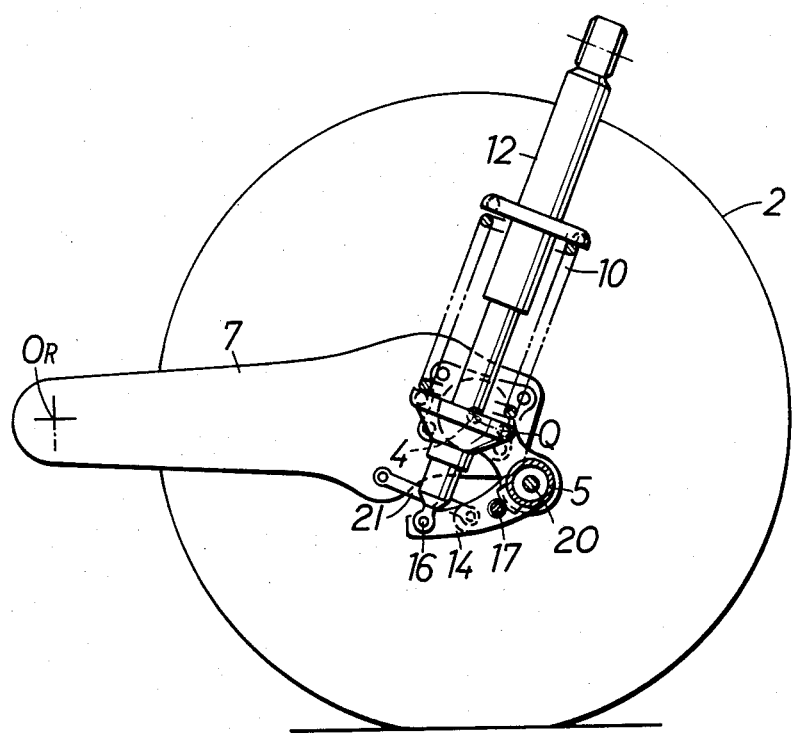
FIG. 4 is a cross sectional side view of an essential part taken on line IV—IV in FIG. 3.

One embodiment of the present invention will be described hereinafter with reference to the accompanying drawings. In FIGS. 3 and 4 showing one embodiment of the present invention, the same reference numerals are used to designate parts similar to those shown in FIGS. 1 and 2. Axles 3 and 4 for rotatably supporting left wheel 1 and right wheel 2, respectively, are fixedly connected to axle beam 5. The axle beam 5 is disposed to the rear and below the axis of Q of rotation of the wheels 1 and 2. In FIG. 3, a trailing arm 6 at the left side is connected at its front end to the chassis (not shown) for pivotal movement through a rubber bushing around an axis $O_L$ almost parallel to an axis which extends transvesely of the chassis, and is fixed at its rear end to the connecting part between the axle beam 5 and the axle 3. A trailing arm 7 at the right side is connected at its front end to the chassis for a pivotal movement through a rubber bushing around an axis $O_R$ almost parallel to an axis which extends transversely of the chassis and is pivotably connected at its rear end to the connecting part between the axle beam 5 and the axle 4 through a bearing 8. When the wheels 1 and 2 move up and down, these trailing arms 6 and 7 are pivotally moved around the axes $O_L$ and $O_R$, respectively, to permit the movement of the wheels but prevent the wheels 1 and 2 from moving in the back and forth direction relative to the chassis.

The axle beam 5 is a hollow tubular member receiving a stabilizer 20. The stabilizer 20 is constructed as a torsion bar. The left end of the stabilizer is connected to the left end of the axis beam 5 through, for example, serrations so as to not to rotate with respect to the axle beam. On the other hand, the right end of the stabilizer projects beyond the axle beam 5 and is rotatably connected to the trailing arm 7 at the right side through a link 21.

The left and right ends of the axle beam 5 are integrally provided with arms 13 and 14 extending forwardly therefrom. Dampers 11 and 12 are rotatably connected between front ends 15 and 16 of these arms 13 and 14, and the chassis, respectively. As will be seen from FIG. 4, the dampers 11 and 12 are inclined rearwardly and disposed such that their axes extend to pass in through or in close proximity to, the axes Q of rotation of the respective wheels 1 and 2. Coil springs 9 and 10 (only the coiled spring 10 is shown in FIG. 4) are disposed coaxially with the dampers 11 and 12.

A panhard rod 17, which is disposed in proximity of and substantially coaxially with the axes Q of rotation to the wheels 1 and 2, is pivotally connected at its right end 18 to a front portion of the axle beam 5 for pivotal movement around an axis which extends substantially in parallel with the longitudinal axis of the chassis. The left end 19 of the panhard rod 17 is pivotally connected to the chassis in such a way that the left end 19 is spaced from the axle beam 5 to a degree somewhat greater than the right end 18 so that the panhard rod 17 serves to limit the relative movement between the axle beam 5 and the chassis in the lateral direction.

Next, the operation of the beam suspension having the above-described construction will be described. For example, when the wheel 1 at the left side passes over a projected portion of the road surface and as a consequence moves up, the wheel 1 and the left end of the axle beam 5 are pivotally moved around the axis $O_L$ by the trailing arm 6 and move up: At this time, the axle beam 5 is rotated relative to the chassis in a direction wherein the front end 15 of the arm 13 is moved down. But the whole arm 13 is pivotally moved around the axis $O_L$ and greatly moves up so that the distance between the front end 15 and the chassis is reduced to compress the damper 11 and coil spring 9 and normal vibration absorbing action is carried out.

While the rotation of the axle beam 5 is also transmitted to the right side, that rotation is not directly transmitted to the trailing arm 7 since the axle beam 5 and the right-hand trailing arm 7 are pivotally connected with each other, but such rotation is resiliently transmitted through the stabilizer 20 and link 21.

When the axle beam 5 rotates, the front end 16 of the arm 14 secured integrally therewith is rotated and moved down but the center of rotation thereof substantially coincides with the axis Q of rotation of the wheel 2. Since the axis of the damper 12 is designed to traverse a point in proximity of the axis Q to rotation, a change in length of the damper 12 resulting from the downward pivotal movement of the front end 16 of the arm 14 is extremely small.

Accordingly, the damper 12 is not greatly extended and tension is not applied to the coil spring 10 disposed coaxially therewith so as to change the spring reaction thereof. However, it will be apparent that the coil spring 10 can be mounted on a location separately from the damper 12.

In the case wheel 2 at the right side moves up, the stabilizer 20 is merely subjected to torsional deformation and the damper 11 is insignificantly affected thereby. Even if the arm 13 is pivotally moved downwardly, the damper 11 is not greatly extended, similarly to the above-described case, since the axis of the damper 11 is disposed such that it traverses a point in proximity to the axis Q of rotation of the wheel 1.

In case a lateral force is applied to the wheels 1 and 2, the line of action of said force substantially coincides with the axes Q of rotation of the wheels 1 and 2, respectively. This force produces a moment of rotation around the point of connection 19 of the panhard rod 17 to the chassis, but since the axis of the panhard rod 17 is disposed in the vicinity of the axis Q of rotation and the point of connection 19 to the chassis is positioned substantially on the axis Q of rotation, the moment is extremely small. Thus, the amount of deviation of the wheels 1 and 2 by the moment of rotation is also extremely small.

While in the above-described embodiment, the axle beam 5 is displaced rearwardly from the axis Q of rotation of the wheel, it should be noted that the axle beam 5 can be disposed frontwardly of the axis Q of rotation of the wheel, conversely to the former. In that case, the arms 13 and 14 are projected rearwardly, and the dampers 11 and 12 are provided between the rear end thereof and the chassis whereby the axes of the dampers 11 and 12 traverse the point in the vicinity of the axis Q of rotation of the wheel. Furthermore, the panhard rod 17 is also disposed rearwardly of the axle beam 5 whereby the axis thereof is also positioned in the vicinity of the axis Q of rotation of the wheel.

As described above, according to the present invention, there is provided a trailing link type beam suspension wherein one of a pair of left and right trailing arms is fixed to the axle beam whereas the other thereof is pivotally connected to the axle beam, the damper provided between the axle beam and the chassis is disposed so that the axis thereof passes a point in the vicinity of the axis of rotation of the wheel. With this arrangement, even if one wheel is moved up and down whereby the axle beam is rotated relative to the chassis, the damper is not greatly expanded or compressed and no attenuation force is produced in the damper to deteriorate the riding comfort. Moreover, even with the coil spring disposed coaxially with the damper, its spring reaction force is not varied. Therefore, the damper and coil spring can be disposed coaxially with each other, whereby no particular space for mounting the coil spring is required. In addition, since the damper and coil spring can be provided as a unit, the suspension can be easily assembled and processed.

Furthermore, the panhard rod is mounted, in a substantially lateral direction of the chassis, between the axle beam, provided frontwardly or rearwardly of the axis of rotation of the wheel, and the chassis, and the axis of the panhard rod is positioned in the vicinity of the axis of rotation of the wheel. With this arrangement, even if a lateral force is applied to the wheel, the moment of rotation produced thereby is small and the wheel is insignificantly displaced by said moment of rotation. Accordingly, it is possible to enhance the steering stability of the vehicle. Also, since the moment of rotation is small, the rubber bushing provided at the point of connection between the trailing arm and the chassis can be made small in spring constant, and transmission of vibrations from the axle beam to the chassis can be absorbed to provide good riding comfort.

While the invention has been described through a preferred embodiment, it will be understood for those skilled in the art that various changes and modifications may be made without departing from the spirit and scope of the invention described in the appended claims.

What is claimed is:

1. A trailing link type beam suspension for a vehicle having a chassis with left and right sides and a longitudinal axis, said beam suspension comprising: a pair of left and right trailing arms; an axle beam fixed to one of said trailing arms and pivotally connected to the other of said trailing arms; said axle beam supporting a pair of left and right wheels for rotation about an axis; said other trailing arm being pivotably connected to said axle beam for rotation about the axis of rotation of the wheels, said axle beam being rotatable where it is connected to said other of said trailing arms for rotation about the axis of rotation of the wheels and a pair of dampers mounted between said axle beam and the chassis of a vehicle; said axle beam being disposed in a position displaced from the axis of rotation of the wheels in the longitudinal direction of the chassis, said dampers being operative along axes which pass through the axis of rotation of the wheels.

2. A trailing link type beam suspension as claimed in claim 1 comprising coil springs coaxially mounted with said dampers.

3. A trailing link type beam suspension as claimed in claim 1 comprising a pair of arms on said axle beam projecting longitudinally thereof, said pair of dampers being respectively connected to said pair of arms.

4. A trailing link type beam suspension as claimed in claim 3, wherein said dampers are inclined between the connection to said arms and the connection to said chassis.

5. A trailing link type beam suspension as claimed in claim 1 comprising a panhard rod connected to the axle beam and the chassis to resist lateral load of the chassis.

6. A trailing link type beam suspension as claimed in claim 5, wherein said panhard rod has an axis positioned in the vicinity of the axis of rotation of the wheels.

7. A trailing link type beam suspension as claimed in claim 1, wherein said pair of arms project from the axle beam in a direction opposite the direction in which the axle beam is displaced from the axis of rotation of the wheels.

8. A trailing link type beam suspension as claimed in claim 1 wherein said axle beam has an axis, said beam suspension further comprising means connecting said dampers to said axle beam at respective locations longitudinally offset from the axis of said axle beam to angulate said dampers.

9. A trailing link type beam suspension for a vehicle having a chassis with left and right sides and a longitudinal axis, said beam suspension comprising: an axle beam supporting a left wheel and a right wheel for rotation about an axis; a pair of left and right trailing arms connected to said chassis of the vehicle, one of said trailing arms being fixed to said axle beam and the other trailing arm being pivotably connected to said axle beam for rotation about the axis of rotation of the wheels; a pair of dampers mounted between the axle beam and the chassis; and a panhard rod connected to the axle beam and the chassis; said axle beam being longitudinally offset from the axis of rotation of the wheels to provide a space between the wheels around the axis of rotation thereof, said axle beam being rotatable about said axis of rotation of the wheels where it is pivotably connected to said other trailing arm, said pair of dampers and said panhard rod being disposed in said space with the axes of the dampers passing substantially through the axis of rotation of the wheels and the axis of said panhard rod located substantially adjacent the axis of rotation of the wheels.

10. A trailing link type beam suspension as claimed in claim 9 wherein said panhard rod is disposed substantially coaxially with the axis of rotation of the wheels.

11. A trailing link type beam suspension as claimed in claim 9 wherein said axle beam has an axis, said beam suspension further comprising means connecting said dampers to said axle beam at respective locations longitudinally offset from the axis of said axle beam to angulate said dampers.

* * * * *